BEST AVAILABLE COP

United States Patent [19]
Schmidt

[11] 3,898,687
[45] Aug. 5, 1975

[54] MOLDED CHASSIS FOR RECORD CARD HANDLING MACHINE

[75] Inventor: Josef Schmidt, Chicago, Ill.

[73] Assignee: Bell & Howell Company, Chicago, Ill.

[22] Filed: June 6, 1973

[21] Appl. No.: 367,514

[52] U.S. Cl. ................ 360/2; 235/61.11 D; 360/88
[51] Int. Cl. ........................................... G11b 25/04
[58] Field of Search........ 346/74 M; 360/2, 88, 101; 235/61.11 C, 61.11 D, 61.11 R; 274/4

[56] References Cited

UNITED STATES PATENTS

| | | | |
|---|---|---|---|
| 3,685,836 | 8/1972 | Chernowitz | 360/2 |
| 3,691,312 | 9/1972 | Petersen | 360/2 |
| 3,748,442 | 7/1973 | Lovendusky | 235/61.11 D |
| 3,760,164 | 9/1973 | Kral | 235/61.11 D |
| 3,784,763 | 1/1974 | Budrose | 235/61.11 D |
| 3,787,661 | 1/1974 | Moorman | 360/2 |

FOREIGN PATENTS OR APPLICATIONS

| | | | |
|---|---|---|---|
| 603,322 | 3/1960 | Italy | 360/101 |

*Primary Examiner*—Bernard Konick
*Assistant Examiner*—Jay P. Lucas
*Attorney, Agent, or Firm*—Roger M. Fitz-Gerald; John R. Hoffman; Robert Stapleton

[57] ABSTRACT

Improvements are provided in an apparatus for transporting a vertically oriented record card carrying a magnetic stripe across a transducer head for recording and playback functions. The improvement is in the form of a chassis system for mounting mechanical and electrical components of the card transport apparatus which can be readily molded in a single operation. The chassis is a unitary structure which includes a deck joined to a battery compartment. An integral upstanding flange on the deck faces a wall of the battery compartment to define a card receiving groove therebetween with the floor of the groove formed by the upper surface of the deck. Openings are provided in the battery compartment side wall at the groove for receiving a capstan to drive the record cards through the groove and for receiving a switch member which controls the capstan motor responsive to the presence of a card in proper position in the groove.

The upper surface of the deck has an aligned pair of bearing blocks for receiving a shaft at axially spaced positions. Each bearing block is provided with an associated pair of opposing ears defining a snap receiver for receiving and retaining the shaft within the bearing block. The lower surface of the deck has a plurality of ribs which are adapted to radially engage the base of a post to secure the post in an upright position relative to the lower surface. Arm members also extend from the lower surface of the deck and have opposing projecting fingers for engaging and holding a circuit board. Further, a pair of spaced slide brackets are provided for receiving a slide member for longitudinally sliding movement parallel to the deck.

1 Claim, 9 Drawing Figures

MOLDED CHASSIS FOR RECORD CARD HANDLING MACHINE

FIELD OF THE INVENTION

This invention relates to an apparatus for transporting and processing magnetically striped record cards. More particularly, this invention relates to an improved unitary frame or chassis system for such an apparatus.

SUMMARY OF THE INVENTION

The frame or chassis of the present invention is a unitary molded plastic structure for receiving and directly mounting the major electrical and mechanical components of the record card handling apparatus, and includes a deck portion joined to a battery compartment. The battery compartment has a side wall which upstands at the edge of the deck and an upstanding flange is provided on the deck parallel to and spaced slightly from the compartment side wall to define a record card receiving groove between the flange and the side wall. Record cards can be transported through the groove for recording or playback by a transducer head.

In one form of the chassis, an opening is provided in the battery compartment side wall for receiving a capstan or roller for driving the record cards along the groove. Further, the upper surface of the deck is provided with an integral pair of spaced bearing block means for receiving a shaft at axially spaced positions along the shaft. There is also provided a hold down means such as a snap receiver for retaining the shaft within the bearing block. Integral with the lower surface of the deck are provided a pluarlity of ribs for receiving and securing a post in an erect position, a circuit board mounting system for mounting a circuit board spaced from and parallel to the deck, and slide mounting brackets for mounting a slide member used in the operation of the record card handling mechanism.

While this invention is susceptible of embodiment in many different forms, there is shown in the drawings and will herein be described in detail a specific embodiment thereof, with the understanding that the present disclosure is to be considered as an exemplification of the principles of the invention and is not intended to limit the invention to the embodiment illustrated.

DESCRIPTION OF THE PREFERRED EMBODIMENT

Figure 1:
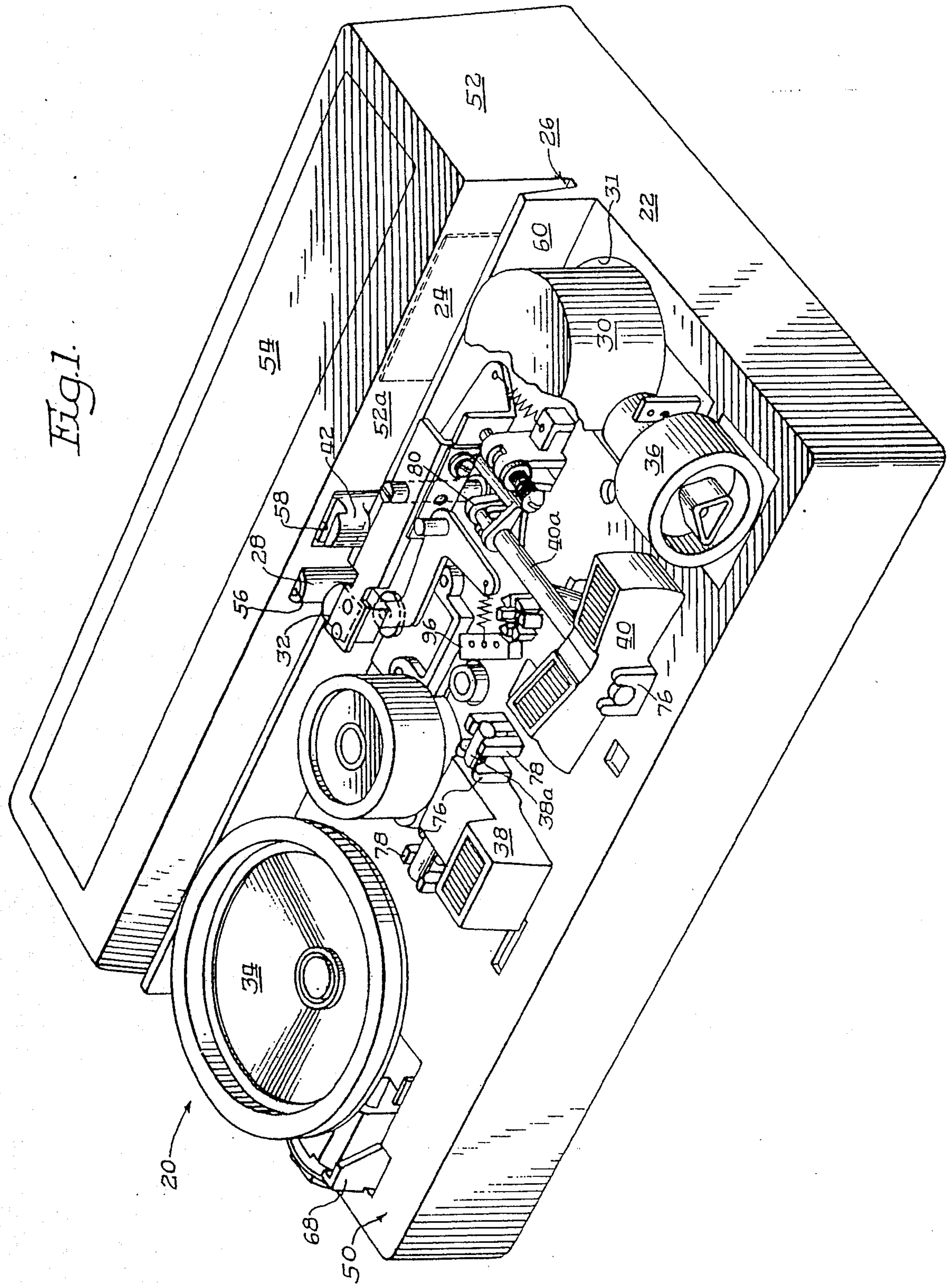
FIG. 1 is a top perspective view of a card handling and processing apparatus using a form of unitary chassis of this invention.

Referring first to FIG. 1, a record card handling apparatus shown generally at 20 utilizes a chassis 22 in accordance with the present invention. The details of the structure and operation of the card handling mechanism are disclosed by J. Schmidt, in co-pending application Ser. No. 367,513, entitled "Information Card Transport, Recording and Readout Mechanism" filed June 6, 1973, the disclosure of which is incorporated herein by reference. In general, a record card 24 is placed in a card receiving groove 26 and is moved into engagement with a capstan 28 driven by a motor 30 positioned in a recess 31. The motor moves the card at a constant rate past a transducer head 32 for recording or playback functions. Various components of the apparatus are shown mounted on the chassis 22, including a speaker 34, a volume control 36, a "record" button 38 having integral pivot pins 38*a*, a transducer head shifter rocker button 40 having an integral shaft 40*a*, and a motor control switch button 42. Button 42 detects the presence of a record card 24 approaching capstan 28 and energizes motor 30 to drive the capstan 28 to move the record card along the groove 26 past the transducer head 32.

Figures 2, 3:
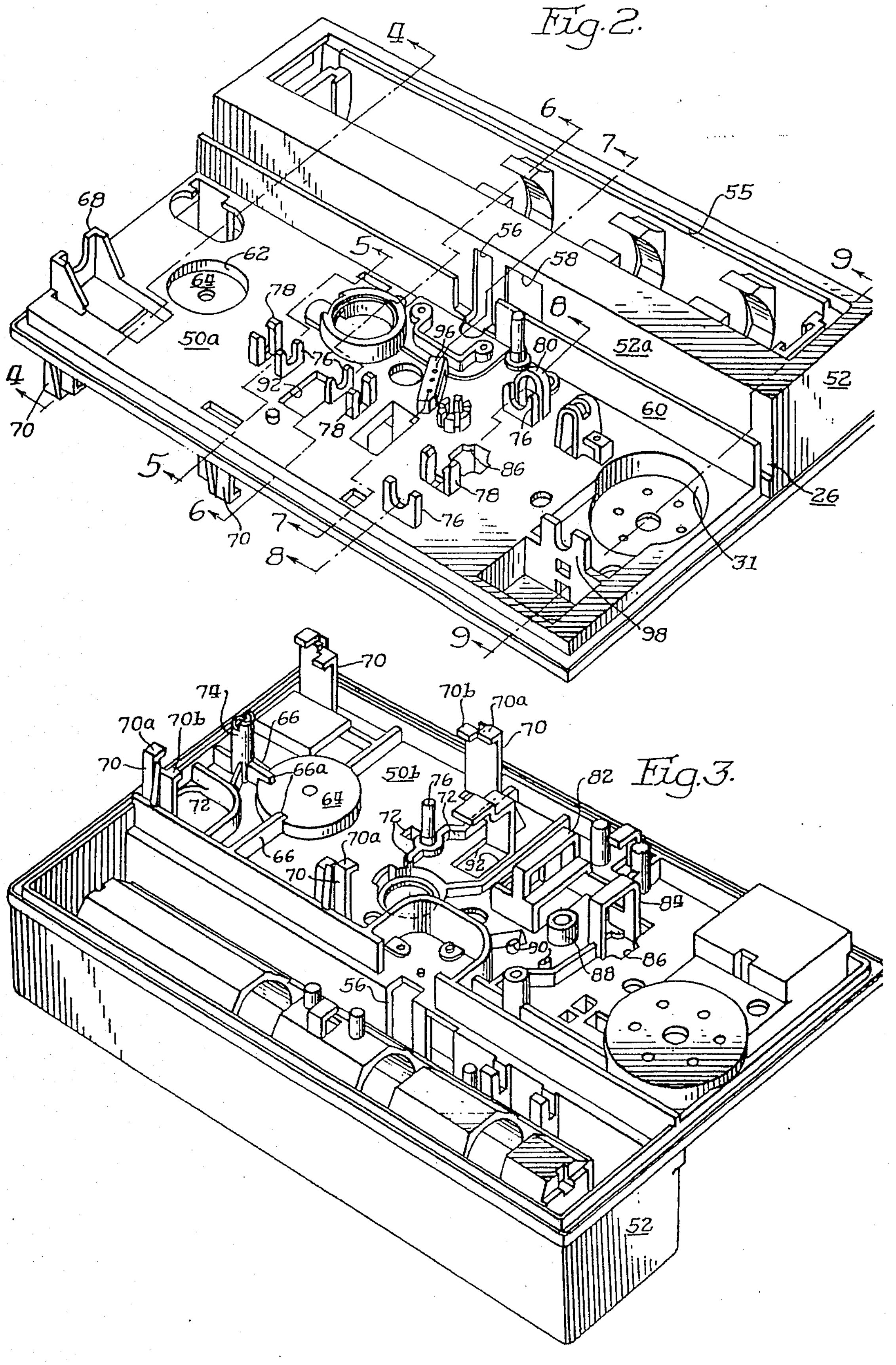
FIG. 2 is a top perspective view as in FIG. 1 but with the mechanical and electrical parts of the apparatus removed to show the details of the chassis.
FIG. 3 is a bottom perspective view of the chassis of FIG. 2.

Referring now especially to FIGS. 1–3, the chassis 22 includes a deck 50 integral with a battery compartment 52 having a lid 54 (FIG. 1) for access to the compartment interior through an opening 55 (FIG. 2). The top surface of deck 50 is indicated at 50*a* (FIG. 2) and the bottom surface at 50*b* (FIG. 3).

Battery compartment 52 has an upstanding side wall 52*a* (FIGS. 2, 4, 6, 7 and 9). An upstanding flange 60 (FIGS. 1, 2, 4–7 and 9), integral with deck 50 at surface 50*a* is provided closely facing side wall 52*a* to form the card receiving groove 26 for guiding the record cards during transport. Side wall 52*a* is also provided with a capstan receiving opening 56 in which a capstan 28 can be mounted as seen in FIG. 1, and switch button receiving opening 58 for receiving the switch button as at 42 (FIG. 1).

The deck 50 has a speaker mounting port 62 which is backed by a speaker mounting plate 64 molded integrally with the deck 50 at the bottom surface 50*b* (FIG. 3) thereof. A plurality of ribs 66, integral with deck 50, have ends 66*a* joining plate 64. An integral bracket 68 is also provided protruding upwardly from top surface 50*a* (FIGS. 1, 2 and 4) which defines a jack for receiving and removably supporting an earphone or the like. A second jack, not shown, may be added adjacent and to the right (as viewed in FIG. 2) of the earphone jack or bracket 68 for receiving and removably supporting an exterior microphone. These jacks enhance the versatility of the chassis by affording means to receive and support externally used, but connected, implements.

Figures 4, 5, 6, 7, 8, 9:
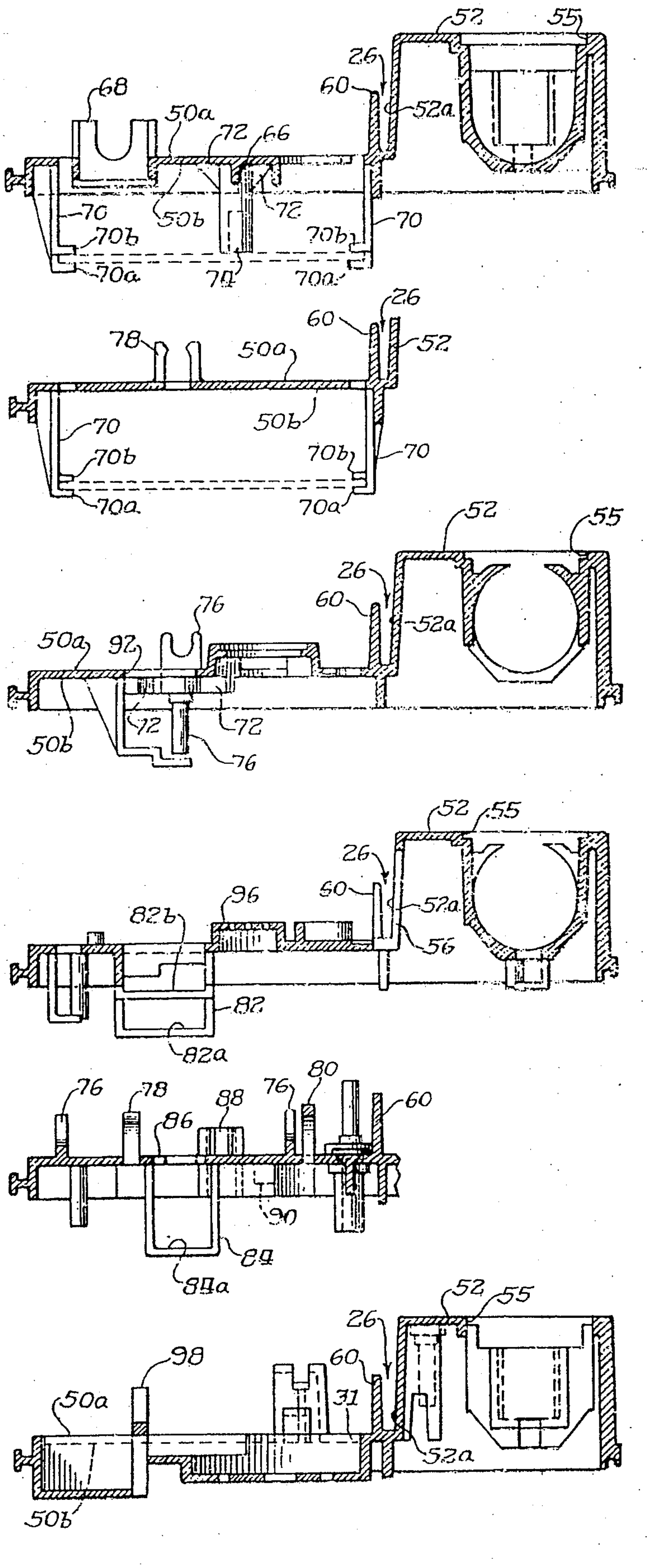
FIG. 4 is a section along line 4—4 of FIG. 2.
FIG. 5 is a fragmentary section taken along line 5—5 of FIG. 2.
FIG. 6 is a section along line 6—6 of FIG. 2.
FIG. 7 is a section along line 7—7 of FIG. 2.
FIG. 8 is a fragmentary section taken along line 8—8 of FIG. 2.
FIG. 9 is a section along line 9—9 of FIG. 2.

Depending downwardly from the bottom surface 50*b* (FIGS. 3 through 5) are two spaced opposing pairs of circuit board support arms 70 terminating in inwardly directed vertically spaced fingers 70*a* and 70*b* for grasping the edge of a circuit board as shown in phantom in FIGS. 4 and 5 with a snug fit between the fingers 70*a* and 70*b*.

Ribs 72 (FIGS. 3 and 4) also are integral with the deck 50 at the bottom surface 50*b* thereof. These ribs, as well as one of the ribs 66, are provided with blunt ends which abut posts such as seen at 74 and 76 (FIGS.

BEST AVAILABLE COP 3 and 6) to secure the posts in upright or erect positions relative to bottom surface 50*b*.

The upper surface 50*a* of deck 50 also is provided with a plurality of integral bearing blocks 76 (FIGS. 1, 2, 6 and 8) for mounting shafts or pivot pins. Associated with the bearing blocks 76 are ear mounts 78 (FIGS. 1, 2, 5 and 8) which snap receive the shaft or pivot pin to hold the shaft or pivot pin in bearing relation with the bearing block 76. A hold down bracket 80 (FIGS. 1, 2 and 8) also is provided as a shaft retainer associated with one of the bearing blocks 76.

A pair of slide brackets 82 and 84, integral with and depending from the bottom surface 50*b* of the deck (FIGS. 3, 7 and 8), have slide supporting shelves at 82*a* (FIGS. 3 and 7) and 84*a* (FIGS. 3 and 8). Adjacent bracket 84 there is provided an opening 86 (FIGS. 2, 3 and 8) through which an arm may be projected from above the deck surface 50*a* to operate a slide member resting on shelves 82*a* and 84*a*, as described in detail in the above identified Schmidt application. Bracket 82 has a second shelf 32*b* for supporting a second slide member which can be operated by a crank pivotally mounted at 88, also as described in detail in said application. Stop lugs 90 (FIGS. 3 and 8), integral with bottom surface 50*b*, limit the movement of the crank.

Another opening 92 (FIGS. 2, 3 and 6) can accommodate the downwardly depending arm of switch button 38 (FIG. 1) for operating a switching element mounted below the deck 50. Other elements integral with deck 50 at upper surface 50*a* are a spring anchor block 96 (FIGS. 1, 2 and 7) and a volume control mounting bracket 98 (FIGS. 2 and 9). The integral chassis can be quickly and easily molded of plastic material in a single molding operation with the mold halves separating away from each other in directions corresponding to the upward and downward direction as seen in the drawings. The integral chassis provides the major mounting elements for the operating mechanical and electrical components of the card handling apparatus.

I claim:

1. A chassis for mounting mechanical and electrical components to provide a record card handling machine for recording and playing messages on a magnetic stripe portion of a record card, which chassis comprises a unitary structure including:

1. a plate element defining a deck portion having upper and lower surfaces;
2. a plurality of walls defining a battery compartment along one edge of said deck portion including a side wall upstanding at the deck portion edge;
3. an upstanding flange adjacent said deck portion edge upstanding from the deck portion and parallel to and extending lengthwise along said battery compartment side wall defining a groove therebetween with the floor of the groove defined by the upper surface of the deck portion along the deck edge;
4. an opening in said battery compartment side wall for receiving a capstan for driving record cards along said groove;
5. port means through the deck for receiving and mounting an electric motor for driving the capstan;
6. integral with the deck portion at the upper surface thereof:
   a. an aligned pair of bearing block means for receiving a shaft at axially spaced positions and a pair of opposing ears defining a snap receiver associated with each bearing block for retaining the shaft portion within the bearing block;
   b. an opening in said deck portion associated with said bearing block means for accommodating an arm extending from the shaft;
   c. a spring anchor block; and
   d. an upstanding plate having a receiver opening at its free end for receiving a rotary switch; and
7. integral with the deck portion at the lower surface thereof:
   a. a plurality of ribs for radially engaging the base of a post to secure the post in position upstanding from said lower surface;
   b. circuit board mounting means including four corner posts each having a pair of inwardly projecting fingers defining a receiver therebetween for receiving the edge of a circuit board and supporting the circuit board in a position spaced from and parallel to the deck portion lower surface, the fingers of two of said corner posts facing the fingers of the other two;
   c. a pair of spaced depending U-brackets having aligned slide receiving openings for receiving a slide member operable by the shaft arm and parallel to the deck, one of said brackets including a second opening for receiving a second slide member;
   d. port means for mounting a crank for operating the second slide member; and
   e. a pair of stop lugs for limiting the movement of the crank means.

* * * * *